United States Patent Office 3,472,634
Patented Oct. 14, 1969

3,472,634
PRODUCTION OF NITROGEN-HALOGEN COMPOUNDS
Mervin D. Marshall, Frombell, and Leon L. Lewis, Butler, Pa., assignors to Mine Safety Appliances Company, Pittsburgh, Pa., a corporation of Pennsylvania
No Drawing. Continuation of application Ser. No. 41,443, July 7, 1960. This application July 2, 1964, Ser. No. 380,091
Int. Cl. C01b *21/52*
U.S. Cl. 23—356                                                           3 Claims

ABSTRACT OF THE DISCLOSURE

Dinitrogen tetrafluoride and chloro-difluoroamine are prepared by reacting chlorine with difluoramine in the presence of a solvent for difluoroamine.

---

This application is a continuation of our copending application Serial No. 41,443, filed July 7, 1960.

This invention relates to a method of producing certain compounds in which halogen atoms are combined with nitrogen, and more particularly to the production of chlorodifluoramine, $ClNF_2$, and dinitrogen tetrafluoride, $N_2F_4$.

The compounds to which this invention relates are relatively new products in which halogen atoms are bonded to nitrogen. These compounds are reactive and are excellent intermediates and oxidizing agents. For example, dinitrogen tetrafluoride, $N_2F_4$, is effectively used as an oxidizer in rocket and similar type engines where it is used in conjunction with conventional fuels such as hydrazine. In such applications the dinitrogen tetrafluoride takes the place of and is used in the same manner as the well known oxidizer $ClF_3$ and other similar oxidizers. Dinitrogen tetrafluoride also can be used to produce other oxidizers, such as, for example, the new compound $NF_2ClO_4$, which is made by reacting $N_2F_4$ with nitronium perchlorate, as disclosed in our copending application Serial No. 41,445, filed July 7, 1960.

Chlorodifluoramine, $ClNF_2$, is also an excellent and quite reactive intermediate and can be used to make, for example, 1-chloro-2-difluoraminoethane by reacting it with ethylene. Moreover, chlorodifluoramine is a good additive for use in conjunction with those oxidizers now employed in rocket engines. Thus, it can be added to hydrogen peroxide to impart properties to that oxidizer which are associated with fluorine, whereby the mixture has more desirable properties than does the hydrogen peroxide alone. The mixture is used just as is the hydrogen peroxide.

The process of our invention comprises the reaction of chlorine with difluoramine in a solvent for difluoramine. This reaction produces a mixture of dinitrogen tetrafluoride and chlorodifluoramine, with the proportion of each product varying with the conditions used, as will be described hereinafter.

The temperature at which the reaction is carried out is not of critical import. Generally room temperature or below is used, and quite low temperatures, i.e., down below —100° C., have been used with success. Higher temperatures can also be used, although it is best to avoid very high temperatures if chlorodifluoramine is the desired product, because chlorodifluoramine tends to decompose to dinitrogen tetrafluoride at elevated temperatures.

As stated above, the reaction of difluoramine with chlorine invariably produces a mixture of products. The proportion of these products can be greatly varied by using different ratios of reactants and by controlling the conditions under which the reaction is carried out. The most important variable in determining the product which is obtained is the ratio of chlorine to difluoramine used in the starting materials for the process. High chlorine to difluoramine mol ratios favor the formation of chlorodifluoramine; a ratio of $Cl_2$ to $HNF_2$ of over about 2:1 is necessary to produce any substantial amount of chlorodifluoramine. At ratios of chlorine to difluoramine below about 2:1, the predominant product is $N_2F_4$.

Mixing favors the production of chlorodifluoramine; that is, the better the reactants are mixed during the reaction period, the higher the yield of chlorodifluoramine which is obtained. In this connection, we have found that the use of a solvent for difluoramine aids in mixing and thereby in the production of chlorodifluoramine. We have generally used carbon tetrachloride for this purpose, although other solvents can also be used, for example, diethylether or benzene.

In one example of the method and practice of our invention 0.94 mols of difluoramine was added to 5.07 mols of chlorine in carbon tetrachloride. The mixture was stirred for two and one-half hours at room temperature and then the volatile products were removed and separated by fractional condensation. Analysis of the product showed that almost a quantitative yield of chlorodifluoramine had been produced, with only a trace of dinitrogen tetrafluoride being obtained.

The effect of varying the ratios of the reactants was studied in still other tests which were carried out in accordance with the examples and the method described above. The results of several of these tests are set forth below in Table I.

TABLE I.—MOL RATIOS

| Reactants $Cl_2/HNF_2$: | Products $ClNF_2/N_2F_4$ |
|---|---|
| 1.0 | About 0 |
| 2.0 | 0.7 |
| 4.7 | 2.0 |
| 7.4 | 3.0 |

It may be noted that, while in all cases both products were obtained to some extent, an equimolar ratio of reactants produced almost exclusively dinitrogen tetrafluoride, whereas mol ratios of chlorine to difluoramine above about 2:1 resulted in the product being predominately chlorodifluoramine.

According to the provisions of the patent statues, we have explained the principle and mode of practicing our invention and have described what we now consider to be its best embodiments. However, we desire to have it understood that, within the scope of the appended claims, the invention may be practiced otherwise than as specifically described.

We claim:
1. A method of producing dinitrogen tetrafluoride, $N_2F_4$, and chlorodifluoramine, $ClNF_2$, which comprises reacting elemental chlorine with difluoramine, $HNF_2$, in the presence of an organic solvent for difluoramine inert to the reactants and products and recovering the chlorodifluoramine and dinitrogen tetrafluoride.

2. A method of producing chlorodifluoramine which comprises reacting elemental chlorine with difluoramine in a mol ratio of chlorine to difluoramine of at least 2:1 in the presence of an organic solvent for difluoramine inert to the reactants and products and recovering the chlorodifluoramine thus produced.

3. A method in accordance with claim 2 in which the solvent is carbon tetrachloride.

References Cited

UNITED STATES PATENTS

| 2,678,258 | 5/1954 | Haller | 23—190 |
| 3,077,377 | 2/1963 | Lawton et al. | 23—356 |

OSCAR R. VERTIZ, Primary Examiner

G. O. PETERS, Assistant Examiner

U.S. Cl. X.R.

23—205